(12) United States Patent
Qiu et al.

(10) Patent No.: US 12,157,670 B2
(45) Date of Patent: Dec. 3, 2024

(54) METHOD FOR TRANSFERRING CARBON NANOTUBES AQUEOUS PHASE DISPERSION INTO ORGANIC PHASE DISPERSION

(71) Applicant: SUZHOU INSTITUTE OF NANO-TECH AND NANO-BIONICS (SINANO), CHINESE ACADEMY OF SCIENCES, Suzhou (CN)

(72) Inventors: Song Qiu, Suzhou (CN); Leitao Cao, Suzhou (CN); Yahui Li, Suzhou (CN); Hehua Jin, Suzhou (CN); Qingwen Li, Suzhou (CN)

(73) Assignee: SUZHOU INSTITUTE OF NANO-TECH AND NANO-BIONICS (SINANO), CHINESE ACADEMY OF SCIENCES, Suzhou (CN)

( * ) Notice: Subject to any disclaimer, the term of this patent is extended or adjusted under 35 U.S.C. 154(b) by 0 days.

(21) Appl. No.: 18/687,836

(22) PCT Filed: Mar. 20, 2023

(86) PCT No.: PCT/CN2023/082459
§ 371 (c)(1),
(2) Date: Feb. 29, 2024

(87) PCT Pub. No.: WO2024/113542
PCT Pub. Date: Jun. 6, 2024

(65) Prior Publication Data
US 2024/0327220 A1  Oct. 3, 2024

(30) Foreign Application Priority Data
Nov. 29, 2022 (CN) .......................... 202211511672.X

(51) Int. Cl.
*C01B 32/174* (2017.01)
*C01B 32/159* (2017.01)

(52) U.S. Cl.
CPC .......... *C01B 32/174* (2017.08); *C01B 32/159* (2017.08); *C01B 2202/02* (2013.01); *C01B 2202/06* (2013.01)

(58) Field of Classification Search
CPC ...... C01G 41/00; C01G 39/00; C01P 2006/82
See application file for complete search history.

(56) References Cited

U.S. PATENT DOCUMENTS

2006/0115640 A1* 6/2006 Yodh .................. B82Y 15/00
428/221
2010/0326891 A1 12/2010 Wang et al.

FOREIGN PATENT DOCUMENTS

| CN | 101407598 A | 4/2009 |
|---|---|---|
| CN | 102427133 A | 4/2012 |

(Continued)

OTHER PUBLICATIONS

Maples, Randall D., et al. "Optimized solvent-exchange synthesis method for C60 colloidal dispersions." Journal of colloid and interface science 370.1 (2012): 27-31.*

(Continued)

*Primary Examiner* — Richard M Rump
(74) *Attorney, Agent, or Firm* — Bayramoglu Law Offices LLC

(57) ABSTRACT

A method for transferring a carbon nanotubes aqueous phase dispersion into an organic phase dispersion includes: providing the carbon nanotubes aqueous dispersion; mixing the carbon nanotubes aqueous dispersion with a first solvent to obtain a first suspension, where the first solvent includes a hydrophilic organic solvent; mixing the first suspension with a second solvent to form two stratified phases, allow to obtain a second suspension, where the second solvent (Continued)

includes a hydrophobic organic solvent; mixing the second suspension with a third solvent to obtain a third suspension; and subjecting the second suspension or the third suspension to dispersion treatment to obtain a carbon nanotubes organic dispersion, thereby realizing solvent transfer of the carbon nanotubes dispersion from aqueous to organic phase. The method can transfer the carbon nanotubes aqueous dispersion into the organic dispersion, and the transfer efficiency is 70%-95%.

15 Claims, 3 Drawing Sheets

(56) References Cited

FOREIGN PATENT DOCUMENTS

| | | |
|---|---|---|
| CN | 104140483 A | 11/2014 |
| CN | 105585000 A | 5/2016 |
| CN | 105645380 A | 6/2016 |
| CN | 111348641 A | 6/2020 |
| JP | 2015059079 A | 3/2015 |

OTHER PUBLICATIONS

Han Li, et al., Inner- and outer-wall sorting of double-walled carbon nanotubes, Nature Nanotechnology, 2017, pp. 1176-1183, vol. 12.

Jamie E. Rossi, et al., Removal of sodium dodecyl sulfate surfactant from aqueous dispersions of single-wall carbon nanotubes, Journal of Colloid and Interface Science, 2017, pp. 140-148, vol. 495.

Robert Nibler et al., Chirality enriched carbon nanotubes with tunable wrapping via corona phase exchange purification (CPEP), Nanoscale, 2019, pp. 11159-11166, vol. 11.

* cited by examiner

METHOD FOR TRANSFERRING CARBON NANOTUBES AQUEOUS PHASE DISPERSION INTO ORGANIC PHASE DISPERSION

CROSS REFERENCE TO THE RELATED APPLICATIONS

This application is the national phase entry of International Application No. PCT/CN2023/082459, filed on Mar. 20, 2023, which is based upon and claims priority to Chinese Patent Application No. 202211511672.X, filed on Nov. 29, 2022, the entire contents of which are incorporated herein by reference.

TECHNICAL FIELD

The present application belongs to the technical field of separation and purification, and relates to a method for transferring a carbon nanotubes aqueous phase dispersion into an organic phase dispersion.

BACKGROUND

Since carbon nanotubes have excellent optical and electrical properties, it is considered to be the most potential material in nanoscience and technology. In recent years, carbon nanotubes dispersion and separation technologies have developed rapidly, such as a surfactant-coated aqueous phase system: a density gradient ultracentrifugation method, an ion exchange chromatography method, a gel chromatography column method, an electrophoresis method, an aqueous two-phase separation system, etc. These methods all can disperse or separate multi-walled carbon nanotubes or single-walled carbon nanotubes to a certain extent. Meanwhile, carbon nanotubes for different practical applications need to be dispersed in different solvents or dispersant systems. For example, the application of single-walled carbon nanotubes in the electronic field requires less polymer or dispersant, so that a schottky barrier between the tubes and a resistance between the carbon nanotubes and an electrode is reduced, thereby enhancing the application performance of the single-walled carbon nanotubes in the electronic field. For example, narrow-diameter chiral carbon nanotubes or semiconductor or metal carbon nanotubes can be easily separated in an aqueous phase. However, there are many surfactants on the surface of the carbon nanotubes and it is difficult to further separate them, which relatively limits the application of the carbon nanotubes in optoelectronics. For example, semiconductors with higher purity or single-walled carbon nanotubes with specific chirality dispersed in an organic phase can better meet the application of the carbon nanotubes in optoelectronics. For example, the multi-walled carbon nanotubes have good electrical conductivity, but a large amount of a surfactant needs to be added to disperse the multi-walled carbon nanotubes in the aqueous phase, which will reduce the electrical conductivity of the multi-walled tubes. For example, the multi-wall carbon nanotubes dispersed in the organic phase have good electrical conductivity. Therefore, if the current aqueous phase dispersant system can be replaced into an organic phase solution, it is expected to better broaden the application prospects of the carbon nanotubes.

In order to achieve replacement between carbon nanotubes solution systems, a primary goal is to remove the dispersant in the current solution as much as possible. For example, in an aqueous phase system, since the dispersant on the surfaces of the carbon nanotubes is of a state of dynamic equilibrium with the dispersant in the solution, some researchers have tried to remove the surfactant by filtration and dialysis, but these methods will lead to the aggregation of the carbon tubes, and meanwhile, the cleanliness of the surfaces of the collected carbon nanotubes is relatively low. The secondary goal is to redisperse the carbon nanotubes in a new solvent to form a solution under suitable dispersion conditions, so as to meet their applications in various fields. The current shortcomings are: first, the surfactant on the external surfaces of the carbon nanotubes cannot be effectively removed; and second, there are many agglomerations among the carbon tubes.

There are very few current technologies that can cover these aspects at the same time. Many aspects of research have been carried out on the removal of a surfactant from an aqueous phase solution, but less research has been done on the problem of agglomeration among the carbon tubes. Jamie E. Rossi et al. has collected single-walled carbon nanotubes through a suction filtration process, where by combining organic solvent washing and high-temperature treatment processes, the surfactant can be effectively removed, but meanwhile, strong interaction forces will occur among the carbon tubes, making it difficult to realize system transfer. Han Li and his collaborators have enriched the carbon nanotubes through suction filtration, where after multiple times of rinsing with ethanol, a process of transferring an aqueous phase into an organic phase can be achieved. This washing process will intensify the agglomeration among the carbon tubes, so that the transfer process has a relatively large loss and is time-consuming. Robert Nißler and his/her collaborators have used a method of salt layer suction filtration, which can not only effectively remove the surfactant of the carbon tubes, but also ensure that the agglomeration among the carbon nanotubes is reduced, and the carbon nanotubes are more effectively transferred from the organic phase into the aqueous phase, but the salt layer suction filtration method is no longer applicable during transferring the aqueous phase into the organic phase. However, the aforementioned methods still have many shortcomings. On one hand, the time taken by the suction filtration process will increase sharply with the increase of the number of the carbon tubes, making it difficult to achieve scale-up applications. On the other hand, the filtration and cleaning process will cause the problem of agglomeration of carbon tubes, and redispersion will lead to a high proportion of carbon nanotubes loss and require a lot of time and energy sources.

SUMMARY

A main objective of the present application is to provide a method for transferring a carbon nanotubes aqueous phase dispersion into an organic phase dispersion to overcome the shortcomings of the prior art.

In order to achieve the aforementioned objectives of the present disclosure, the technical solution adopted by the present application includes the following ones.

An embodiment of the present application provide a method for transferring a carbon nanotubes aqueous phase dispersion into an organic phase dispersion, which includes:
  providing the carbon nanotubes aqueous phase dispersion;
  mixing the carbon nanotubes aqueous phase dispersion with a first solvent to obtain a first suspension, where the first solvent includes a hydrophilic organic solvent;

mixing the first suspension with a second solvent to form two stratified phases, so as to obtain a second suspension, where the second solvent includes a hydrophobic organic solvent;

mixing the second suspension with a third solvent to obtain a third suspension; and subjecting the second suspension or the third suspension to dispersion treatment to obtain a carbon nanotubes organic dispersion, thereby realizing solvent transfer of the carbon nanotubes dispersion from the aqueous phase to the organic phase.

Compared with the prior art, the present application has the following beneficial effects.

(1) The present application can ensure the high cleanliness of the carbon nanotubes through an extraction process and a solvent conversion process, and at the same time making the transfer efficiency at 70%-95% transfers the carbon nanotubes dispersion from the aqueous phase into the organic phase; and (2) for the method provided by the present application, if the polymer transferred in the organic phase has certain semiconductor or narrow chiral separation attributes, the semiconductor or monochiral purity of the carbon nanotubes in the original aqueous phase will be significantly improved.

BRIEF DESCRIPTION OF THE DRAWINGS

To describe the technical solutions in the embodiments of the present application or in the prior art more clearly, the following briefly describes the accompanying drawings required for describing the embodiments or the prior art. Apparently, the accompanying drawings in the following description show only some embodiments stated in the present application, and other drawings may still be derived from these accompanying drawings by those of ordinary skills in the art without creative efforts.

DETAILED DESCRIPTION OF THE EMBODIMENTS

Figure 1:
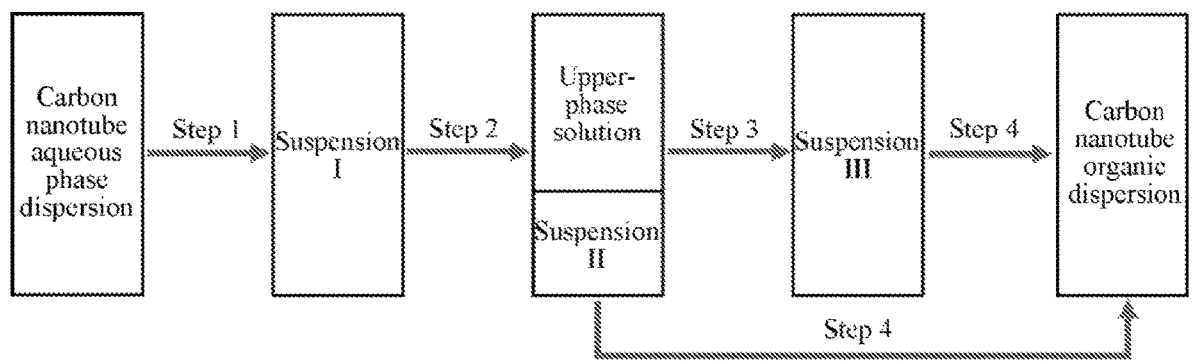
FIG. 1 is a schematic flow chart of a method for transferring a carbon nanotubes aqueous phase dispersion into an organic phase dispersion according to a typical embodiment of the present application.

In view of the shortcomings of the prior art, the inventor of the present disclosure is able to propose the technical solution of the present application after long-term research and extensive practice, which is mainly that smooth and efficient completion of the transfer process can be achieved only by a series of transfer methods of a carbon nanotubes aqueous phase dispersion→achieving removal of a surfactant by an extraction method→solvent replacement→an organic phase dispersion.

The following clearly and completely describes the technical solutions of the present application. Apparently, the described embodiments are merely a part rather than all of the embodiments of the present application. Based on the embodiments in the present application, all other embodiments obtained by those of ordinary skills in the art without creative labor are within the claimed scope of the present application.

Specifically, as one aspect of the technical solution of the present application, it involves a method for transferring a carbon nanotubes aqueous phase dispersion into an organic phase dispersion, which includes:

providing the carbon nanotubes aqueous phase dispersion;

mixing the carbon nanotubes aqueous phase dispersion with a first solvent to obtain a first suspension, where the first solvent includes a hydrophilic organic solvent;

mixing the first suspension with a second solvent to form two stratified phases, so as to obtain a second suspension, where the second solvent includes a hydrophobic organic solvent;

mixing the second suspension with a third solvent to obtain a third suspension; and subjecting the second suspension or the third suspension to dispersion treatment to obtain a carbon nanotubes organic dispersion, thereby realizing solvent transfer of the carbon nanotubes dispersion from the aqueous phase to the organic phase.

In some preferred embodiments, the carbon nanotubes contained in the carbon nanotubes aqueous phase dispersion include any one or a combination of two or more of single-walled carbon nanotubes, multi-walled carbon nanotubes, and separated carbon nanotubes, but are not limited thereto.

In some preferred embodiments, a dispersant contained in the carbon nanotubes aqueous phase dispersion includes, but is not limited to, an ionic surfactant and/or a nonionic dispersant.

Further, the ionic surfactant includes any one or a combination of two or more of sodium deoxycholate, sodium cholate, sodium dodecyl sulfate, and sodium dodecyl benzene sulfonate, but is not limited thereto.

Further, the nonionic dispersant includes any one or a combination of two or more of triton, laurinol, oleyl alcohol, Tween, cyclohexanol, nonylphenol, and a single-stranded DNA, but is not limited thereto.

Further, the carbon nanotubes aqueous phase dispersion further includes a water-soluble additive introduced during a carbon nanotubes separation process. The water-soluble additive includes dextran, polyethylene glycol, polyacrylamide, polyethylene glycol diamine and polyvinylpyrrolidone introduced in a aqueous two-phase separation process; iodixanol or cesium chloride introduced in a gradient density centrifugation process; and a buffer solution (e.g., a sodium chloride solution, a sodium hypochlorite solution, a sodium thiocyanate solution, etc.) introduced in a DNA separation process.

In some preferred embodiments, the method specifically includes: thoroughly mixing the carbon nanotubes aqueous phase dispersion with the first solvent and allowing to stand for 1-30 min, so that at least an active agent adsorption layer on a surface of the carbon nanotubes is destroyed under the action of the first solvent, thereby causing the carbon nanotubes to precipitate and be suspended in the mixed solution.

In some preferred embodiments, the first solvent is an organic solvent that is miscible or partially miscible with water, including any one or a combination of two or more of N,N-dimethylformamide, tetrahydrofuran, dimethyl sulfoxide, N-methylpyrrolidone, dioxane, acetone, methylethylketone, butanone, ethanol and acetonitrile, but is not limited thereto.

In some preferred embodiments, the first suspension includes the carbon nanotubes aqueous phase dispersion and the first solvent.

Further, a volume ratio of water to the first solvent in the first suspension is 1:1-1:6.

In some preferred embodiments, the method specifically includes: thoroughly mixing the first suspension with the second solvent and allowing to stand for 1-15 minutes to form two phases, where the carbon nanotubes are suspended in the second solvent to form the second suspension.

In some preferred embodiments, the second solvent includes any one or a combination of two or more of m-chlorotoluene, toluene, xylene, chlorobenzene, dichloromethane, chloroform, dichloromethane, trichloromethane and trichloroethane, but is not limited thereto.

In some preferred embodiments, a volume ratio of the first solvent to the second solvent is 1:0.5-1:6.

In some preferred embodiments, the method specifically includes: adding the third solvent into the second suspension, mixing them with each other, allowing to stand, removing the supernatant, then adding the third solvent, mixing them with each other and allowing to stand, and repeating the aforementioned operations for 3-10 times to obtain the third suspension.

Further, a volume ratio of the second suspension to the third solvent is 1:3-1:8.

In some preferred embodiments, the third suspension includes the carbon nanotubes and the third solvent, where the content of the second solvent in the third suspension is less than 1 (v/v) %.

In some preferred embodiments, the method specifically includes: subjecting the second suspension or the third suspension to dispersion treatment without a dispersant to obtain a carbon nanotubes organic dispersion; or alternatively mixing the second suspension or the third suspension with a dispersant to obtain a carbon nanotubes organic dispersion through a dispersion process, where the dispersant includes an organic dispersant and/or a polymer dispersant.

In some preferred embodiments, the dispersion treatment manner includes any one of shearing, ultrasonication, homogenization, sand grinding, ball milling, high-pressure jet flow and the like methods, but is not limited thereto.

In some preferred embodiments, when the carbon nanotubes aqueous phase dispersion is obtained through separation by a two-aqueous phase technology, the carbon nanotubes aqueous phase dispersion is firstly pretreated to remove the water-soluble polymers from the carbon nanotubes aqueous phase dispersion.

Specifically, if the carbon nanotubes aqueous phase dispersion is obtained through separation by a two-aqueous phase technology, it will contain more water-soluble polymers, including polyethylene glycol, dextran, etc., and it needs to conduct pretreatment to remove these water-soluble polymers before the system transfer step.

Further, the water-soluble polymers include polyethylene glycol and/or dextran, but are not limited thereto.

Further, the preprocessing includes: mixing a saturated salt solution with the carbon nanotubes dispersion and conducting centrifuging treatment to obtain a co-precipitate of the carbon nanotubes and a surfactant, and then redispersing the co-precipitate of the carbon nanotubes and the surfactant in water to obtain the carbon nanotubes aqueous phase dispersion without the water-soluble polymers.

Still further, the salt in the saturated salt solution includes any one or a combination of two or more of ammonium sulfate, sodium sulfate, magnesium sulfate, sodium chloride, and magnesium chloride, but is not limited thereto.

In some more specific embodiments, the method of transferring the carbon nanotubes aqueous phase dispersion into the organic phase dispersion (the schematic flow chart is shown in FIG. 1) includes:

step 1: the carbon nanotubes aqueous phase dispersion is mixed with the first solvent and allowed to stand for 1-30 min, the surfactant adsorption layer of the carbon nanotubes is destroyed under the action of the first solvent, and the carbon nanotubes are precipitated within 2-20 min and suspended in the solution to obtain a suspension I (i.e., the aforementioned "first suspension", the solvents are water and the first solvent, and the suspended matter is the carbon nanotubes);

step 2: the second solvent is added into and mixed with the suspension I, and allowed to stand, the solution forms two phases within 1-15 min, the surfactant is extracted into an aqueous phase due to hydrophilicity, and the carbon nanotubes are suspended in an organic phase solution due to hydrophobicity, so as to obtain a suspension II (i.e. the aforementioned "second suspension", the solvent being the second solvent, and the suspended matter being carbon nanotubes);

step 3: the third solvent is added into and mixed with the suspension II, and allowed to stand, the carbon nanotubes are gradually settled to the bottom of the solution, at this time the carbon nanotubes are in a state of being loose and not violently agglomerated, the supernatant was removed and then the third solvent was added and mixed with the carbon nanotubes and allowed to stand; this step was repeated for 3-10 times to obtain a suspension III (i.e. the aforementioned "third suspension", the solvent being the third solvent, and the suspended matter being carbon nanotubes); and step 4: the suspension II or suspension III is subjected to a dispersion process to obtain the carbon nanotubes organic dispersion.

An objective of the present application is to remove the surfactant of the carbon nanotubes while reducing the agglomeration among the carbon nanotubes, so that the system transfer process becomes convenient and efficient. The present application provides a method for transferring an aqueous phase system into an organic system by utilizing the hydrophobicity of the carbon nanotubes and the hydrophilicity of the surfactant through extraction and separation. First, the carbon nanotubes aqueous phase dispersion is mixed with the first solvent (e.g., N,N-dimethylformamide), so that the surfactant is dissolved in the first solvent while the carbon nanotubes are suspended in the solution, and finally the second solvent (e.g., m-chlorotoluene) is added, mixed evenly and allowed to stand to collect a suspension of pure carbon nanotubes in the second solvent in a bottom phase. Ultimately, the suspension of pure carbon nanotubes in the second solvent is mixed with the third solvent (e.g., xylene) and allowed to stand, and the upper-layer solution is removed. This process is conducted for 3-10 cycles, and a suspension of the carbon nanotubes in the third solvent can be collected. The advantages of this solution are as follows. (1) It can ensure the high cleanliness of the carbon nanotubes through an extraction process and a solvent conversion process, and at the same time making the transfer efficiency at 70%-95% transfers the carbon nanotubes dispersion from the aqueous phase into the organic phase. (2) The carbon nanotubes in the dispersion of the carbon nanotubes in the second solvent can be settled by addition of the third solvent, and more than 99% of the second solvent can be removed through 3-10 cycles of this process, basically converting the solvent into the third solvent. (3) By combining a salting out process and an extraction process, a narrow-diameter carbon nanotubes dispersion obtained by the aqueous two-phase separation can be further separated into monochiral carbon nanotubes in the polymer system. (4) If the polymer transferred in the organic phase has certain semiconductor or narrow chiral separation attributes, the semiconductor or monochiral purity of the carbon nanotubes in the original aqueous phase will be significantly improved.

In the present application, smooth and efficient completion of the transfer process can be achieved only by a series of transfer methods of a carbon nanotubes aqueous phase dispersion→achieving removal of a surfactant by an extraction method→solvent replacement→an organic phase dispersion.

In the present application, the carbon nanotubes in the second suspension of carbon nanotubes can be settled by addition of the third solvent, and more than 99% of the second solvent can be removed through 3-10 cycles of this process, basically converting the solution into the third solvent.

The method provided by the present application can realize the transfer of the carbon nanotubes aqueous phase dispersion into the organic phase dispersion.

The technical solution of the present application will be further described in detail below in conjunction with several preferred examples and accompanying drawings. The present examples are implemented based on the technical solution of the present invention and provides detailed implementations and specific operating processes. However, the claimed scope of the present application is not limited to the following examples.

Unless otherwise specified, the experimental materials used in the following examples, can be available from conventional biochemical reagent companies.

Example 1

(1) HiPCO carbon nanotubes were mixed with sodium deoxycholate as a dispersant to obtain an aqueous phase dispersion through a dispersion process; and a part of the aqueous phase dispersion was filtered to obtain a carbon nanotubes film I;
(2) the carbon nanotubes aqueous phase dispersion obtained in the step (1) was mixed with dimethyl sulfoxide, underwent simple ultrasonication in water bath, and allowed to stand for 15 min to obtain a suspension I (wherein, a volume ratio of water to dimethyl sulfoxide in the suspension I was 1:3); thereafter chlorobenzene was added into to the suspension I (wherein, a volume ratio of chlorobenzene to the aforementioned dimethyl sulfoxide was 1:2), mixed thoroughly and then allowed to stand for 10 min, and the lower phase was collected as a suspension II; a part of the suspension II was taken and filtered by suction into a carbon nanotubes film II, and a XPS test was conducted on the two batches of carbon nanotubes films I and II, so that it could be determined that the surfactant was completely removed by comparing the Na ion signal intensity in the carbon nanotubes films;
(3) the suspension II obtained in the step (2) was thoroughly mixed with 4 times amount of a toluene solution in a separatory funnel, and allowed to stand, the carbon nanotubes are gradually suspended to the top of the solution, and then the subnatant was removed and further added with a toluene solution; and after 4 cycles, a suspension III could be collected; and
(4) the suspension III obtained in the step (3) was mixed with F8T2 to obtain a HiPCO carbon nanotubes organic phase dispersion through an ultrasonic dispersion process.

Figure 2:
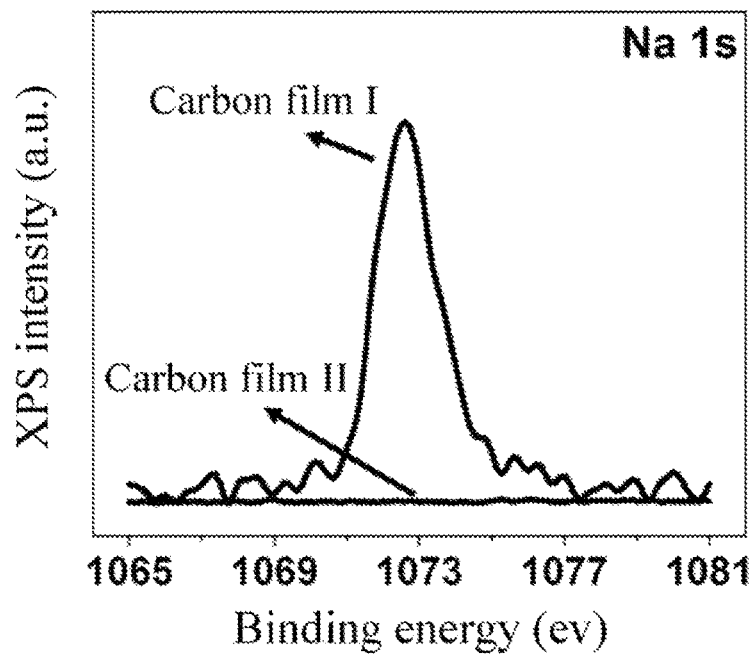
FIG. 2 is a comparison chart of XPS test results in Example 1.

The comparison of XPS test results in this example was shown in FIG. 2.

Figure 3:
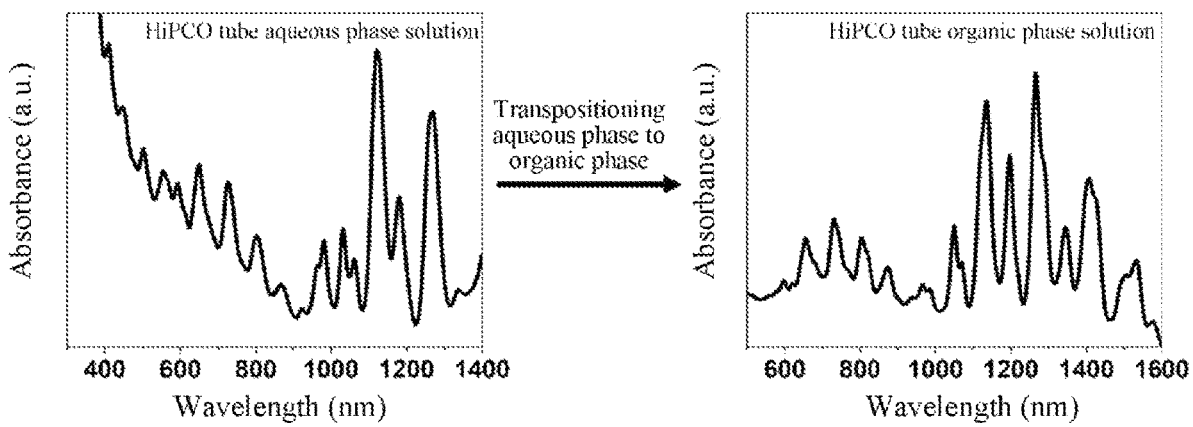
FIG. 3 is a schematic flow chart of transferring HiPCO carbon nanotubes dispersed in DOC from an aqueous phase to an organic phase in Example 1 of the present application.

In this example, a schematic flow chart of transferring the HiPCO carbon nanotubes dispersed in DOC from an aqueous phase to an organic phase was shown in FIG. 3.

Example 2

(1) TUBALL carbon nanotubes were mixed with triton x-100 as a dispersant to obtain a carbon nanotubes aqueous phase dispersion through a dispersion process;
(2) the carbon nanotubes aqueous phase dispersion obtained in the step (1) was mixed with acetonitrile, underwent simple ultrasonication in water bath, and allowed to stand for 1 min to obtain a suspension I (wherein, a volume ratio of water to acetonitrile in the suspension I was 1:1); thereafter dichloromethane was added into the suspension I (wherein, a volume ratio of dichloromethane to the aforementioned acetonitrile was 0.5:1), mixed thoroughly and then allowed to stand for 1 min, and the lower phase was collected as a suspension II;
(3) the suspension II obtained in the step (2) was thoroughly mixed with 3 times amount of a nitrobenzene solution in a separatory funnel, and allowed to stand, the carbon nanotubes are gradually suspended to the top of the solution, and then the subnatant was removed and further added with a nitrobenzene solution; and after 3 cycles, a suspension III could be collected; and
(4) the suspension III obtained in the step (3) was subjected to an ultrasonic dispersion process to obtain a TUBALL carbon nanotubes organic phase dispersion without the dispersant.

Figure 4:
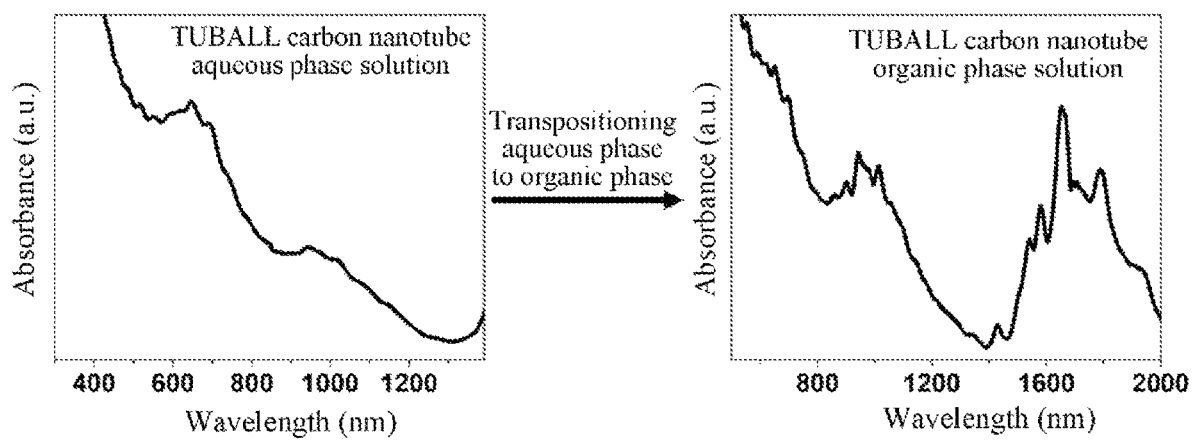
FIG. 4 is a schematic flow chart of transferring TUBALL carbon nanotubes dispersed in triton x-100 from an aqueous phase to an organic phase in Example 2 of the present application.

In this example, the schematic flow chart of transferring the TUBALL carbon nanotubes dispersed in triton x-100 from an aqueous phase to an organic phase was shown in FIG. 4.

Example 3

(1) double-walled carbon nanotubes were mixed with laurinol and oleyl alcohol as dispersants to obtain a carbon nanotubes aqueous phase dispersion through a dispersion process;

(2) the carbon nanotubes aqueous phase dispersion obtained in the step (1) was mixed with tetrahydrofuran, underwent simple ultrasonication in water bath, and allowed to stand for 15 min to obtain a suspension I (wherein, a volume ratio of water to tetrahydrofuran in the suspension I was 1:3); thereafter trichloroethane was added into the suspension I (wherein, a volume ratio of trichloroethane to the aforementioned tetrahydrofuran was 3:1), mixed thoroughly and then allowed to stand for 10 min, and the lower phase was collected as a suspension II;

(3) the suspension II obtained in the step (2) was subjected to a shearing and dispersing process to obtain a double-walled carbon nanotubes organic phase dispersion without the dispersant.

Example 4

(1) A metallic carbon nanotubes raw material was mixed with sodium deoxycholate as a dispersant to obtain a carbon nanotubes aqueous phase dispersion through a dispersion process;

(2) the carbon nanotubes aqueous phase dispersion obtained in the step (1) was mixed with N-methylpyrrolidone, underwent simple ultrasonication in water bath, and allowed to stand for 30 min to obtain a suspension I (wherein, a volume ratio of water to N-methylpyrrolidone in the suspension I was 1:6); thereafter toluene was added into the suspension I (wherein, a volume ratio of toluene to the aforementioned N-methylpyrrolidone was 6:1), mixed thoroughly and then allowed to stand for 15 min, and the lower phase was collected as a suspension II;

(3) the suspension II obtained in the step (2) was thoroughly mixed with 8 times amount of a chloroform solution in a separatory funnel, and allowed to stand, the carbon nanotubes are gradually suspended to the top of the solution, and then the subnatant was removed and further added with a chloroform solution; and after 10 cycles, a suspension III could be collected; and (4) the suspension III obtained in the step (3) was subjected to a high-pressure homogeneous dispersion process to obtain a metallic single-walled carbon nanotubes organic dispersion.

Figure 5:
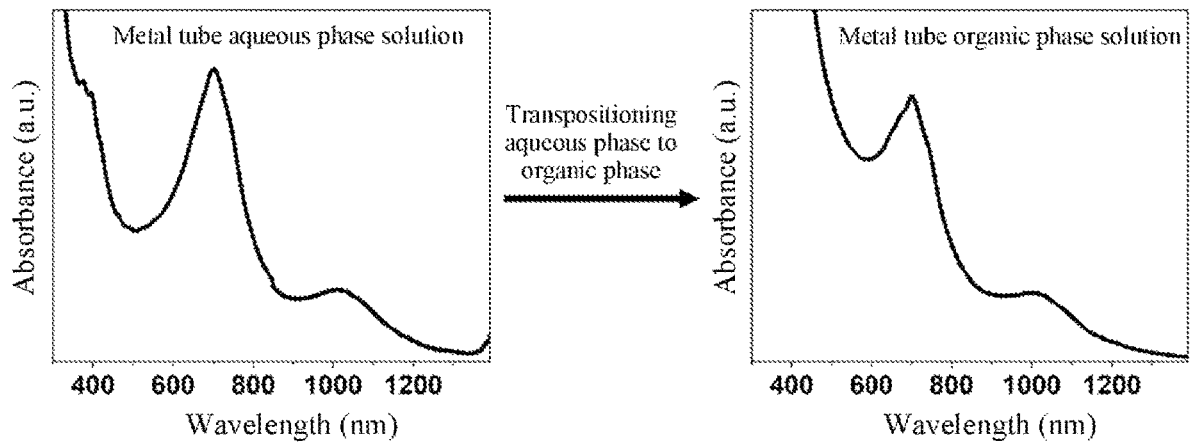
FIG. 5 is a schematic flow chart of transferring a metallic carbon nanotubes dispersion from an aqueous phase to an organic phase in Example 4 of the present application.

In this example, a flow chart of the process of transferring the metallic single-walled carbon nanotubes from an aqueous phase to an organic phase was shown in FIG. 5.

Example 5

(1) A semiconductor carbon nanotubes solution obtained by aqueous two-phase separation (of which the absorption spectrum was shown in FIG. 6) was mixed with a saturated ammonium sulfate solution, and then centrifuged to collect a co-precipitate of carbon nanotubes and a surfactant at the bottom of the solution;

(2) the precipitate obtained in the step (1) was redispersed in deionized water to obtain a carbon nanotubes aqueous phase dispersion;

(3) the carbon nanotubes aqueous phase dispersion obtained in the step (2) was mixed with butanone, underwent simple ultrasonication in water bath, and allowed to stand for 15 min to obtain a suspension I (wherein, a volume ratio of water to butanone in the suspension I was 1:3); thereafter xylene was added into the suspension I (wherein, a volume ratio of xylene to the aforementioned butanone was 3:1), mixed thoroughly and then allowed to stand for 10 min, and the lower phase was collected as a suspension II; and (4) the suspension II obtained in the step (3) was mixed with 4HP (an organic dispersant), and subjected to a sanding and dispersion process to obtain a carbon nanotubes organic phase dispersion.

Figure 6:
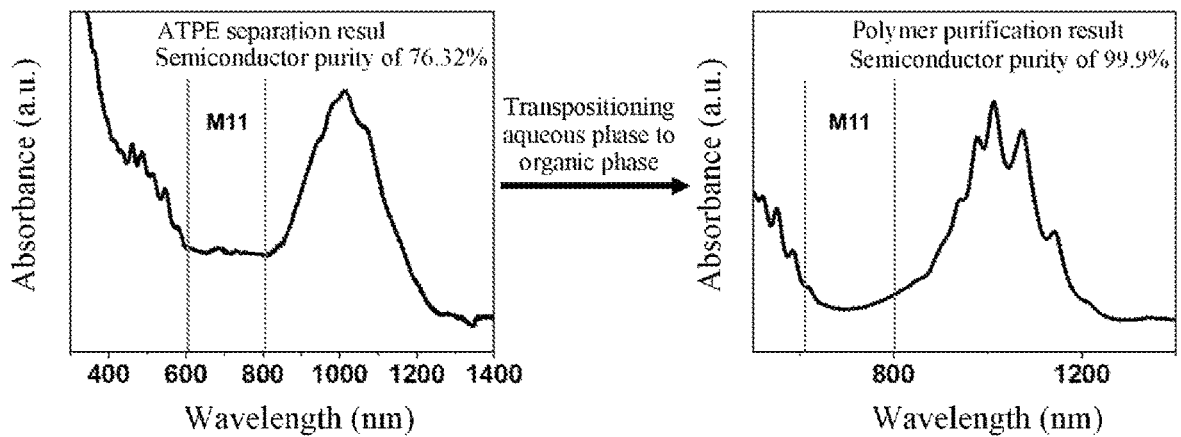
FIG. 6 is a schematic flow chart of transferring a semiconductor carbon nanotubes dispersion from an aqueous phase to an organic phase to improve the purity of semiconductor in Example 5 of the present application.

In this example, a schematic flow chart of transferring the semiconductor carbon nanotubes dispersion from the aqueous phase to the organic phase to achieve chiral separation was shown in FIG. 6. The semiconductor carbon nanotubes dispersion was transferred from the aqueous phase to the organic phase. The semiconductor purity was purified from the original 76.32% to 99.9%.

Example 6

(1) A narrow-diameter carbon nanotubes solution obtained by aqueous two-phase separation (of which the absorption spectrum was shown in FIG. 7) was mixed with a saturated sodium sulfate solution, and then centrifuged to collect a co-precipitate of carbon nanotubes and a surfactant at the bottom of the solution;

(2) the precipitate obtained in the step (1) was redispersed in deionized water to obtain a carbon nanotubes aqueous phase dispersion;

(3) the carbon nanotubes aqueous phase dispersion obtained in the step (2) was mixed with N,N-dimethylformamide (DMF), underwent simple ultrasonication in water bath, and allowed to stand for 15 min to obtain a suspension I (wherein, a volume ratio of water to DMF in the suspension I was 1:3); thereafter m-chlorotoluene was added into the suspension I (wherein, a volume ratio of m-chlorotoluene to the aforementioned DMF was 3:1), mixed thoroughly and then allowed to stand for 10 min, and the lower phase was collected as a suspension II;

(4) the suspension II obtained in the step (3) was thoroughly mixed with four times amount of a toluene solution, and allowed to stand, then the supernatant was removed, and further added with a toluene solution; after four cycles, a suspension III could be collected; and (5) the suspension III obtained in the step (4) was mixed with F8BT, and subjected to a ultrasonic dispersion process to obtain (9,5) SWCNTs with a purity of 88%, and the precipitate was collected.

Figure 7:
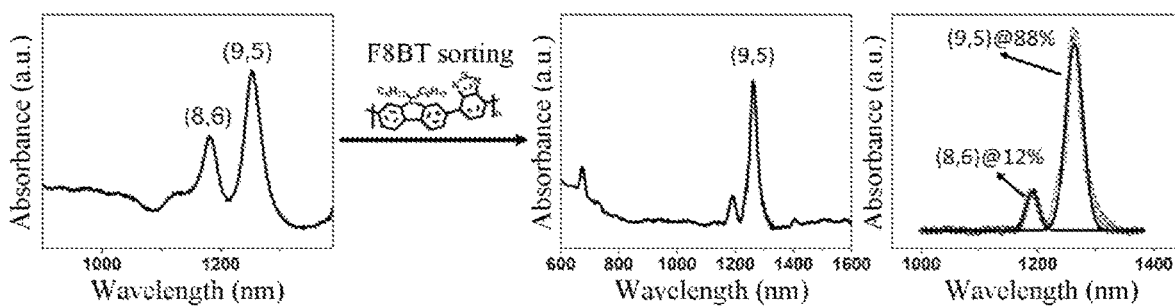
FIG. 7 is a schematic flow chart of transferring a chiral carbon nanotubes dispersion from an aqueous phase to an organic phase to achieve chiral separation in Example 6 of the present application.

In this example, a schematic flow chart of transferring the chiral carbon nanotubes dispersion from the aqueous phase to the organic phase to achieve chiral separation was shown in FIG. 7.

Example 7

(1) A narrow-diameter carbon nanotubes solution obtained by aqueous two-phase separation (of which the absorption spectrum was shown in FIG. 8) was mixed with a saturated sodium chloride solution, and then centrifuged to collect a co-precipitate of carbon nanotubes and a surfactant at the bottom of the solution;

(2) the precipitate obtained in the step (1) was redispersed in deionized water to obtain a carbon nanotubes aqueous phase dispersion;

(3) the carbon nanotubes aqueous phase dispersion obtained in the step (2) was mixed with a N,N-dimethylformamide (DMF) solution, underwent simple ultrasonication in water bath, and allowed to stand for 15 min to obtain a suspension I (wherein, a volume ratio of water to N,N-dimethylformamide in the suspension I was 1:3); thereafter m-chlorotoluene was added into the suspension I (wherein, a volume ratio of m-chlorotoluene to the aforementioned N,N-dimethylformamide was 3:1), mixed thoroughly and then allowed to stand for 10 min, and the lower phase was collected as a suspension II;

(4) the suspension II obtained in the step (3) was thoroughly mixed with four times amount of a xylene solution, and allowed to stand, then the supernatant was removed, and further added with a xylene solution; after four cycles, a dispersion of the carbon nanotubes in xylene could be collected; and (5) the dispersion of the carbon nanotubes in xylene obtained in the step (4) was mixed with PFO-BPy, and subjected to a ultrasonic dispersion process to obtain (11,3) SWCNTs with a purity of 91%, and the precipitate was collected.

Figure 8:
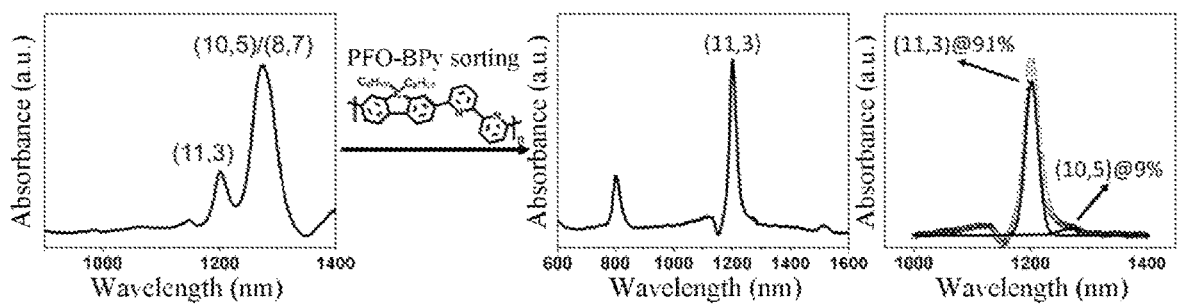
FIG. 8 is a schematic flow chart of transferring a chiral carbon nanotubes dispersion from an aqueous phase to an organic phase to achieve chiral separation in Example 7 of the present application.

In this example, a schematic flow chart of transferring the chiral carbon nanotubes dispersion from the aqueous phase to the organic phase to achieve chiral separation was shown in FIG. 8.

Comparative Example 1

A carbon nanotubes aqueous phase dispersion was filtered to remove a solvent, and the filtrate was directly placed into and subjected to ultrasonic dispersion in a solution of toluene and a dispersant. The redispersed solution of carbon nanotubes in the organic phase was extremely unstable, with a large amount of flocculation and precipitation. More than 80% of the carbon nanotubes were lost from the dispersion after the solution was allowed to stand or subjected to centrifuging treatment.

Comparative Example 2

A HiPCO nanotubes aqueous phase dispersion was taken, directly added into and mixed with chlorobenzene. The two phases were completely insoluble in each other, and the solvent system transfer could not be completed.

Comparative Example 3

(1) A HiPCO nanotubes aqueous phase dispersion was taken, added into N,N-dimethylformamide, and subjected to ultrasonic dispersion to obtain a suspension I;

(2) the suspension I obtained in the step (1) was mixed with chloroform evenly and allowed to stand to form two phases, and the lower phase was taken as a suspension II; an emulsification phenomenon would occur during a phase separation process, and it took a long time for demulsification.

Moreover, the inventor of the present disclosure also have conducted experiments with other raw materials, process operations, and process conditions mentioned in this specification with reference to the aforementioned examples, and have achieved relatively ideal results.

It should be understood that the technical solution of the present application is not limited to the aforementioned specific implementation cases. All technical modifications made based on the technical solution of the present application will fall within the claimed scope of the present application without departing from the purpose of the present application and the scope protected by the claims.

What is claimed is:

1. A method for transferring a carbon nanotubes aqueous phase dispersion into an organic phase dispersion, comprising:
   providing the carbon nanotubes aqueous phase dispersion;
   mixing the carbon nanotubes aqueous phase dispersion with a first solvent to obtain a first suspension, wherein the first solvent comprises a hydrophilic organic solvent;
   mixing the first suspension with a second solvent to form two stratified phases, so as to obtain a second suspension, wherein the second solvent comprises a hydrophobic organic solvent;
   mixing the second suspension with a third solvent to obtain a third suspension; and
   subjecting the second suspension or the third suspension to dispersion treatment to obtain a carbon nanotubes organic dispersion, thereby realizing solvent transfer of the carbon nanotubes dispersion from an aqueous phase to an organic phase.

2. The method according to claim 1, wherein carbon nanotubes contained in the carbon nanotubes aqueous phase dispersion comprise any one or a combination of two or more of single-walled carbon nanotubes, multi-walled carbon nanotubes, and separated carbon nanotubes.

3. The method according to claim 1, wherein a dispersant contained in the carbon nanotubes aqueous phase dispersion comprises at least one of an ionic surfactant and a nonionic dispersant; wherein the ionic surfactant comprises at least two of sodium deoxycholate, sodium cholate, sodium dialkyl sulfate and sodium dodecyl benzene sulfonate; and wherein the nonionic dispersant comprises at least two of triton, laurinol, oleyl alcohol, Tween, cyclohexanol, nonylphenol, and a single-stranded DNA;
   and wherein the carbon nanotubes aqueous phase dispersion further comprises a water-soluble additive introduced during a carbon nanotubes separation process.

4. The method according to claim 1, comprising: thoroughly mixing the carbon nanotubes aqueous phase dispersion with the first solvent and allowing to stand for 1-30 min, so that at least an active agent adsorption layer on a surface of the carbon nanotubes is destroyed under the action of the first solvent, thereby causing the carbon nanotubes to precipitate and be suspended in the mixed solution.

5. The method according to claim 1, wherein the first solvent is an organic solvent that is miscible or partially miscible with water, comprising any one or a combination of two or more of N,N-dimethylformamide, tetrahydrofuran, dimethyl sulfoxide, N-methylpyrrolidone, dioxane, acetone, methylethylketone, butanone, ethanol and acetonitrile.

6. The method according to claim 1, wherein the first suspension comprises the carbon nanotubes aqueous phase dispersion and a first solvent; and preferably, a volume ratio of water to the first solvent in the first suspension is 1:1-1:6.

7. The method according to claim 1, comprising: thoroughly mixing the first suspension with the second solvent and allowing to stand for 1-15 min to form two phases, wherein the carbon nanotubes are suspended in the second solvent to form the second suspension.

8. The method according to claim 1, wherein the second solvent comprises any one or a combination of two or more of m-chlorotoluene, toluene, xylene, chlorobenzene, dichloromethane, chloroform, dichloromethane, trichloromethane and trichloroethane,
   and/or, a volume ratio of the first solvent to the second solvent is 1:0.5-1:6.

9. The method according to claim 1, comprising: adding the third solvent into the second suspension, mixing them with each other, allowing to stand, removing the supernatant, then adding the third solvent, mixing them with each other and allowing to stand, and repeating the aforementioned operations for 3-10 times to obtain the third suspension; and preferably, a volume ratio of the second suspension to the third solvent is 1:3-1:8.

10. The method according to claim 1, wherein the third solvent is an organic solvent; and wherein the organic solvent comprises at least two or more of xylene, toluene, tetrahydrofuran, chlorobenzene, chloroform and nitrobenzene; and wherein the third suspension comprises the carbon nanotubes and the third solvent, wherein a content of the second solvent in the third suspension is less than 1 (v/v) %.

11. The method according to claim 1, comprising: subjecting the second suspension or the third suspension to dispersion treatment without a dispersant to obtain a carbon nanotubes organic dispersion; or alternatively mixing the second suspension or the third suspension with a dispersant to obtain a carbon nanotubes organic dispersion through a dispersion process, wherein the dispersant comprises an organic dispersant and/or a polymer dispersant.

12. The method according to claim 1, wherein the dispersion treatment manner comprises any one of shearing, ultrasonication, high-pressure homogenization, sand grinding, and high-pressure jet flow methods.

13. The method according to claim 1, wherein when the carbon nanotubes aqueous phase dispersion is obtained through separation by a two-aqueous phase technology, the carbon nanotubes aqueous phase dispersion is firstly pretreated to remove water-soluble polymers from the carbon nanotubes aqueous phase dispersion; and preferably, the water-soluble polymers comprise polyethylene glycol and/or dextran.

14. The method according to claim 13, wherein the preprocessing comprises: mixing a saturated salt solution with the carbon nanotubes dispersion and conducting centrifuging treatment to obtain a co-precipitate of the carbon nanotubes and a surfactant, and then redispersing co-precipitate of the carbon nanotubes and the surfactant in water to obtain the carbon nanotubes aqueous phase dispersion without the water-soluble polymers.

15. The method according to claim 14, wherein salt in the saturated salt solution comprises any one or a combination of two or more of ammonium sulfate, sodium sulfate, magnesium sulfate, sodium chloride, and magnesium chloride.

\* \* \* \* \*